United States Patent
Moriano Martin et al.

(10) Patent No.: US 12,424,850 B2
(45) Date of Patent: Sep. 23, 2025

(54) GENERATOR CONTROL FOR OSCILLATION DAMPING

(71) Applicant: Siemens Gamesa Renewable Energy Innovation & Technology S.L., Sarriguren (ES)

(72) Inventors: Javier Moriano Martin, Alcalá de Henares Madrid (ES); Mario Rizo Morente, Alcala de Henares (ES); Mireia Barenys Espadaler, Alcalá de Henares (ES)

(73) Assignee: Siemens Gamesa Renewable Energy Innovation & Technology S. L., Sarriguren (ES)

( * ) Notice: Subject to any disclaimer, the term of this patent is extended or adjusted under 35 U.S.C. 154(b) by 184 days.

(21) Appl. No.: 18/265,995

(22) PCT Filed: Nov. 25, 2021

(86) PCT No.: PCT/EP2021/082940
§ 371 (c)(1),
(2) Date: Jun. 8, 2023

(87) PCT Pub. No.: WO2022/122396
PCT Pub. Date: Jun. 16, 2022

(65) Prior Publication Data
US 2024/0055860 A1 Feb. 15, 2024

(30) Foreign Application Priority Data
Dec. 10, 2020 (EP) .................... 20383077

(51) Int. Cl.
*H02J 3/24* (2006.01)
*F03D 7/02* (2006.01)
*F03D 7/04* (2006.01)

(52) U.S. Cl.
CPC ............ *H02J 3/241* (2020.01); *F03D 7/0272* (2013.01); *F03D 7/044* (2013.01); *H02J 2300/28* (2020.01)

(58) Field of Classification Search
CPC .......... H02J 3/381; H02J 3/1807; Y02E 40/30
(Continued)

(56) References Cited

U.S. PATENT DOCUMENTS

| 6,853,094 B2 * | 2/2005 | Feddersen ................ H02P 9/04 322/29 |
| 9,041,234 B2 * | 5/2015 | Lu ........................... H02H 7/06 290/44 |

(Continued)

FOREIGN PATENT DOCUMENTS

| CN | 103746628 B | 11/2014 |
| CN | 109 995 080 A | 7/2019 |

(Continued)

OTHER PUBLICATIONS

Mohsen Ghafouri, SSCI Damping Controller Design for Series-Compensated DFIG-Based Wind Parks Considering Implementation Challenges, Jul. 2019, IEEE, vol. 34, No. 4, pp. 2644-2653 (Year: 2019).*

(Continued)

*Primary Examiner* — Charles Reid, Jr.
(74) *Attorney, Agent, or Firm* — Schmeiser, Olsen & Watts, LLP

(57) ABSTRACT

A control system for controlling the operation of a doubly fed induction generator of an electrical power system, such as a wind turbine, is provided. A rotor side converter coupled to a rotor of the DFIG is controlled by the control system. The control system includes an outer controller to generate a reference value for a control variable in accordance with which the operation of the DFIG is to be controlled and an (Continued)

inner controller that receives the reference value and provides feedback control of the rotor side converter. The inner controller is a state feedback controller obtains at least one state of the power system or the power grid that is different from the control variable. The control structure of the state feedback controller causes the electrical power system to act as a passive system at least in a predefined frequency range.

17 Claims, 8 Drawing Sheets

(58) Field of Classification Search
USPC .......................................................... 322/29
See application file for complete search history.

(56) References Cited

U.S. PATENT DOCUMENTS

| | | | |
|---|---|---|---|
| 10,622,923 | B2 | 4/2020 | Andersen et al. |
| 2007/0052244 | A1* | 3/2007 | Hudson ................ H02P 9/102 |
| | | | 290/44 |
| 2013/0176751 | A1 | 7/2013 | Olea et al. |
| 2015/0249413 | A1* | 9/2015 | Ren ........................ F03D 9/255 |
| | | | 322/29 |
| 2017/0353036 | A1 | 12/2017 | Gil Lizarbe et al. |
| 2019/0140569 | A1 | 5/2019 | Schnetzka et al. |

FOREIGN PATENT DOCUMENTS

| | | |
|---|---|---|
| EP | 3166197 A1 | 5/2017 |
| EP | 3073631 B1 | 5/2019 |
| EP | 3861631 B1 | 7/2022 |
| WO | 2011112571 A2 | 9/2011 |
| WO | 2020/125920 A1 | 6/2020 |

OTHER PUBLICATIONS

Dr. Jean-Luc Thomas, Flexible AC Transmission Systems, International Workshop on Facts & Wind Farms, Carlos III University—Electrical Engineering Department, Madrid, Jun. 20-21, 2005, 150 pages (4 parts).
E. Saiz and A. Santillan, Toar Solutions for SR, GD327677-en, Jul. 2017, Gamesa, 17 pages.
E. Saiz, Toar Unstable/Weak/Low Noise Grids (Networks Taxonomy), GD298297-en, Gamesa, Mar. 2016, 44 pages.
J. Moriano, Test report of Subsynchronous Iterationat the Tecnalia Small Scale Test Bench, Gamesa, Apr. 2019, 35 pages.
International Search Report & Written Opinion for PCT/EP2021/082940 issued on Mar. 18, 2022.
Xu Yanhui et al.—"Mitigation of Subsynchronous Resonance in Series-Compensated DFIG Wind Farm Using Active Disturbance Rejection Control", IEEE Access, vol. 7, May 28, 2019, pp. 68812-68822.
Ghafouri et al.—"SSCI Damping Controller Design for Series-Compensated DFIG-Based Wind Parks . . .", IEEE Transactions on Power Systems, vol. 34, No. 4, Jul. 2019, pp. 2644-2653.

* cited by examiner

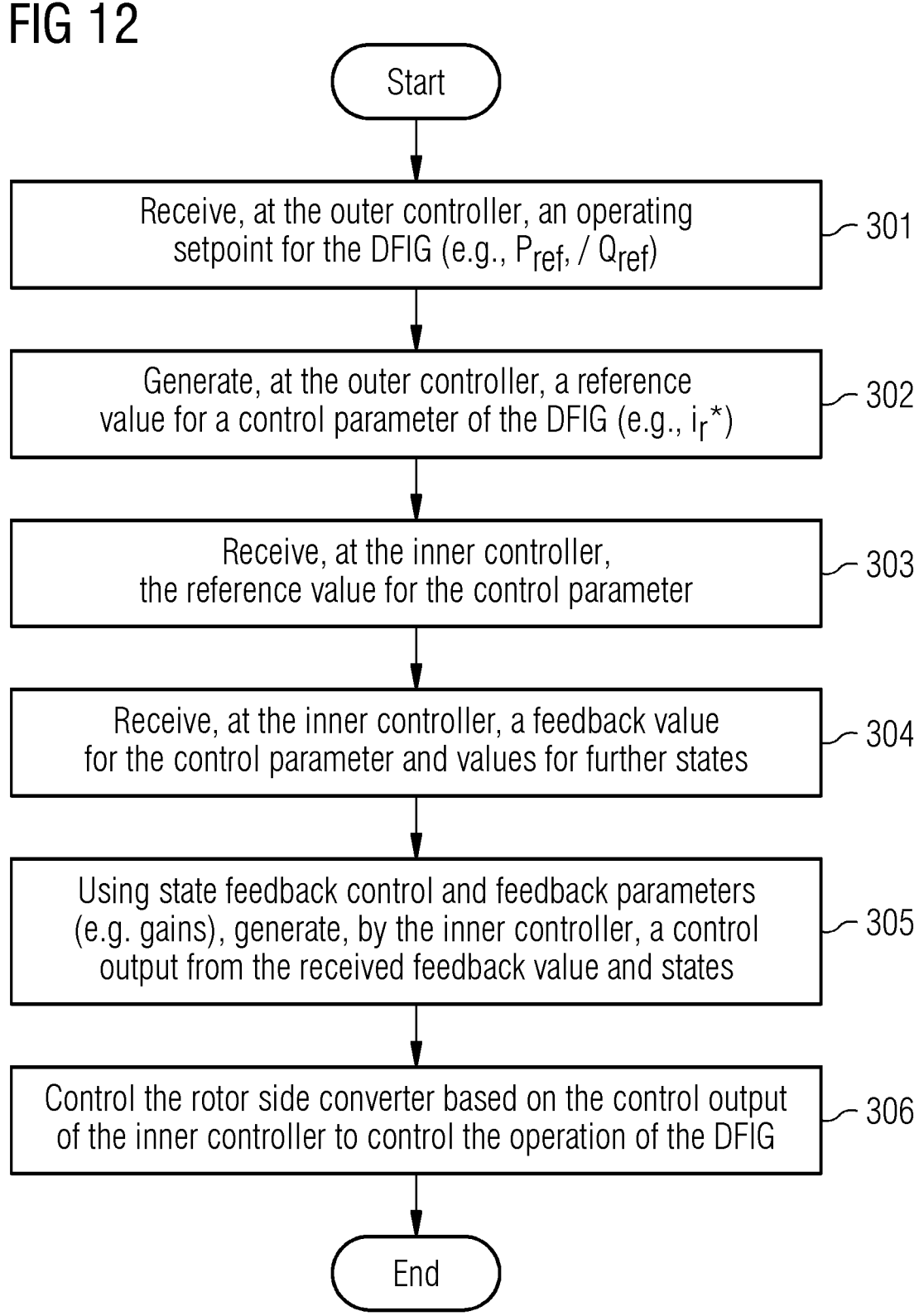

GENERATOR CONTROL FOR OSCILLATION DAMPING

CROSS-REFERENCE TO RELATED APPLICATIONS

This application claims priority to PCT Application No. PCT/EP2021/082940, having a filing date of Nov. 25, 2021, which claims priority to EP Application No. 20383077.3, having a filing date of Dec. 10, 2020, the entire contents both of which are hereby incorporated by reference.

FIELD OF TECHNOLOGY

The following relates to a control system for controlling the operation of a doubly fed induction generator (DFIG), in particular of a wind turbine electrical power system. The following further relates to a method of controlling the operation of such doubly fed induction generator and to a respective computer program.

BACKGROUND

The power transfer capacity of long-distance AC electric lines is constrained due to their intrinsic impedance rather than thermal limits. The impedance, which is defined as a complex value that measures the opposition to the current when voltage is applied, increases with length of the line. The increment of the reactance (imaginary part of the impedance) makes it difficult to keep the voltage at the remote end of the line within a desired range (voltage collapse). As mitigation measure, it is known to use series capacitors (SC) for effectively shortening long lines, reducing line impedance and boosting line capacity. The compensation factor (CF) is defined as the reduction in impedance achieved by the SC divided by the original line reactance. Compensation can be provided by fixed capacitors, thyristor-switched series capacitors (TSSC) or thyristor-controlled series capacitors (TCSC). While fixed capacitors provide an unaltered CF, TSSC can vary the CF with a certain low dynamic. Series capacitors are often used in today's electric systems due to their simplicity and low cost.

While SCs are effective from the steady-state point of view, their inclusion in the line changes the dynamic behavior of the well-known inductive lines, which is illustrated in FIG. 1. The comparison in FIG. 1 is focused on the low frequency region and high frequency effects are disregarded. As shown in the first row at 501, a typical uncompensated power line can be modeled as a series resistor plus inductance for a low frequency range. Its equivalent admittance can be represented with a $1^{st}$ order transfer function (TF) with a natural behavior centered at DC frequency. Any voltage excitation of this type of power line returns a transient response characterized by a DC component, as shown in the current waveform diagram 502 of FIG. 1. Regarding the power domain shown in diagram 503, the transient component is centered at the fundamental frequency $f_0$ (50 Hz in this example). This behavior is typical in inductive systems (inductance, transformers, cables, electric machines, etc.). On the other hand, a series capacitor compensated (SCC) line can be represented by adding a capacitor in series with the resistor and inductance, as shown at 511. The equivalent admittance is given by a $2^{nd}$ order system, with a complex-conjugate pair of poles in most cases. Consequently, the natural response is no longer characterized by a DC component but by a transient component with two components of the same frequency $f_p$ (in the example 6 Hz) but of opposite sign (i.e., $\pm f_p$), as shown in the current waveform diagram 512. In the power domain shown in diagram 513, these two sequences are displaced by $f_0$, giving rise to the sub-synchronous mode at $f_0-f_p$ (44 Hz in the example) and super-synchronous mode $f_0+f_p$ (56 Hz in the example).

Given its low damping and natural frequency, the passive sub-synchronous mode of series capacitor compensated (SCC) power lines might interact with other systems connected to the electric grid giving rise to different phenomena grouped under the term sub-synchronous interaction (SSI), such as sub-synchronous resonance (SSR) or sub-synchronous control interaction (SSCI). These interactions might result in underdamped oscillations and instability, leading to the interruption of power supply and possibly to dangerous conditions for the integrity of the elements of the system. SSCI has for example been observed in wind farms (WFs).

As shown in FIG. 2, a wind turbine 10 may comprise a rotor hub 11 with rotor blades 12 coupled via a gearbox 13 to a doubly fed induction generator (DFIG) 20. The DFIG may comprise a stator 22 that may be coupled (via the wind turbine transformer 32) to the power grid 200, in particular to the power line 210 that may be compensated by the series connected capacitor 211. The rotor 21 may be connected via a back-to-back converter 50 that may comprise a rotor side converter (RSC) 51, a grid side converter (GSC) 52 and an intermediate DC link 53, wherein the generator 20 may be coupled to the transformer 32 and the power grid 200. The converter 50 may be controlled by a converter controller 100, which may comprise a processing unit 101 and a memory 102 to implement control functions. A (harmonic) filter 31 to filter converted power may be provided in series with the converter 50. The DFIG generator 20 is two-port network (stator-rotor) and exhibits an induction mode located at rather low frequency. Together with the controller 100, which may control the currents in the rotor of the DFIG, the system can exhibit in a shortage of passivity. A system is passive in a frequency range if it is capable of dissipating energy at that frequency range. In the electric field, this passive element behaves as a (positive-valued) resistor, so that it helps damping oscillations or resonances occurring in a second system connected to it (e.g., grid 200, e.g., power line 210) in such frequency range. If the system is not passive in a frequency range (i.e., it has a shortage of passivity), it contributes with more energy in that frequency range and behaves as a negative-valued resistor, so that oscillations occurring in the second system are not damped but amplified, which can lead to instability.

An example is provided in FIGS. 3 and 4. FIG. 3 shows a frequency spectrum of the closed loop DFIG-based wind turbine conductance, the DFIG being controlled in a conventional way (x-axis: frequency in Hz; y-axis: conductance in arbitrary units). As can be seen, the system does not act as a passive system in a frequency region below the grid frequency (60 Hz in this example), i.e., in the sub-synchronous frequency range. The DFIG based wind turbine with a conventional controller can therefore interact with SCC lines, reducing the damping of the sub-synchronous mode or even increasing oscillations leading to a loss in stability and possibly to the disconnection of the wind turbine from the grid. Such interactions are an example of SSCI. FIG. 4 shows experimental results obtained with a test setup having a power rating of 11 kW and using a converter controller similar to the one used in the converters of installed wind turbines. A cabinet with capacitors and inductors was specifically built to emulate the effect of SCC lines. FIG. 4 shows the active power (curve 515; unit [W]) and reactive power (curve 516; unit [VAR]) over time t for the system. At t=1.75 s the system starts operating with the SCC line, using conventional converter control. When the SCC line becomes predominant in the grid, it interacts with the DFIG system, resulting in an unstable sub-synchronous oscillation, which finally trips the system at about t=2.1 S.

To avoid such power oscillations which are detrimental to the operation of the wind turbine and can result in significant damage to the electric components, it is known to implement a so-called Power System Stabilizer (PSS) that provides so called Power Oscillation Damping (POD). In conventional power plants, such PSSs have been implemented in the Automatic Voltage Regulator (AVR) controlling the generator. The PSS essentially adds an additional signal, corresponding to a feedforward signal, to a predefined voltage reference configured by the AVR logic. This signal is in antiphase with the oscillation in order to compensate it and to improve the damping. Renewable power sources provide new possibilities for ancillary services and oscillation damping, and power converters have been employed to implement a PSS.

An example is described in the document WO2020/125920 A1, wherein the rotor side converter (RSC) of the DFIG is controlled to damp respective oscillations. FIG. 5 shows a respective system setup in which the converter controller 100 implements an outer controller 110 that receives a setpoint for active and reactive power and provides to the inner controller 120 a reference value for operation of the DFIG, e.g., a reference for the rotor current of rotor 21. The output of the inner controller 120 provides a voltage reference to the pulse width modulation (PWM) generator 115 which generates the control pulses for the semiconductor switches of the RSC 51, which are switched such that the respective rotor voltage and current is achieved in the rotor 21, as commonly known. The conventional art for example provides a PSS damping component 111, an output of which is summed to the reference provided by the outer controller 110 at the summing node 113. The damping component 111 comprises for example a Kalman filter that extracts information about the oscillation, and the applied signal counteracts such oscillation, as described above. Further, the document also mentions the application of the respective damping signal to the active power and/or reactive power reference via a respective summation node. As the references are modified, the power output of the DFIG 20 is modulated accordingly, thereby counteracting and damping the oscillations of the SCC line 210.

A typical control structure of a respective inner controller 120 is illustrated in FIG. 6. The controller receives as input a reference $\vec{x}_{ref}$ and a measurement $\vec{x}_{meas}$ of the respective control variable (e.g., rotor current $\vec{i}_r$), and outputs a control signal $\vec{u}_r$ to PWM generator 115 (e.g., modulating voltage). The inner controller is based on a proportional-integral (PI) controller and is decoupled into real (r) and imaginary (i) parts, it includes respective gains, integrators and summation nodes.

As another example, the document "Mitigation of Sub-synchronous Resonance in Series-Compensated DFIG Wind Farm Using Active Disturbance Rejection Control", Xu Yanhui et al., IEEE Access, Volume 7, 28 May 2019, pages 68812-68822, describes the use of active disturbance rejection control for replacing a traditional damping controller and for estimating the total disturbance of the system. A respective compensation signal is added to the current inner loop control of the rotor side converter as an additional control signal.

As a further example, the document "SSCI Damping Controller Design for Series-Compensated DFIG-Based Wind Parks . . . ", Ghafouri et al., IEEE Transactions on Power Systems, Volume 34, No. 4, July 2019, pages 2644-2653, describes the use of a supplementary controller for mitigating subsynchronous control interference. The SSCI damping controller uses a linear quadratic regulator control scheme and outputs a damping signal that is added into the current control loops of the DFIGs of the wind park.

The variability that can be achieved with the conventional methods for mitigating sub-synchronous control interaction, SSCI, is however quite limited. It is desirable to further improve the oscillation damping and to be able to do so fast and efficiently, without significant changes to the wind turbine power system and its general control mechanisms. It is also desirable to be able to easily implement such compensation in a plurality of different types and models of wind turbines.

SUMMARY

An aspect relates to the damping of oscillations occurring on series capacitor compensated power lines and to reduce or avoid sub-synchronous control interaction.

According to a first aspect, a control system for controlling the operation of a doubly-fed induction generator (DFIG) of an electrical power system, e.g., of a wind turbine, is provided. The electrical power system is configured to provide electrical power to a power grid and comprises a rotor side converter (RSC) that is coupled to a rotor of the DFIG to control operation of the DFIG. The control system is coupled to the rotor side converter to control the rotor side converter. The control system comprises an outer controller that is configured to generate a reference value for a control variable in accordance with which the operation of the DFIG is to be controlled. It may for example implement an outer control loop. The control system further comprises an inner controller that is configured to provide an inner control loop and to receive from the outer controller the reference value for the control variable. The inner controller is configured to provide feedback control of the rotor side converter so as to operate the DFIG at the reference value, e.g., operation may track the reference value. The inner controller is a state feedback controller that is configured to obtain at least one state of the power system or the power grid (e.g., of a SCC line) that is different from the control variable. The state feedback controller is configured to control the rotor side converter based on the received reference value for the control variable, a feedback value for the control variable, and the at least one state. A control structure of the feedback controller is selected or configured such that the control of the rotor side converter causes the electrical power system to act as a passive system at least in a predefined frequency range to thereby provide damping of oscillations in this frequency range.

The state feedback controller may in particular cause the electrical power system to damp oscillations occurring on the power grid, in particular on a compensated power line coupled to the electrical power system. The power system may for example have a positive damping ratio with respect to oscillations caused by an interaction of the power system with a connected power line or the power grid. As mentioned above, such oscillations can in particular be originated by a series capacitor compensated (SCC) power line coupled or connected to the electrical power system. By acting as a passive system and damping oscillations, sub-synchronous control interaction between the electrical power system and the connected power line/power grid may be reduced or even be avoided. A passive system is generally a system that consumes or dissipates energy in the respective frequency range. The oscillations may for example be active and/or reactive power oscillations, which may correspond to respective voltage/current oscillations at the coupling point between the electrical power system and the power line/power grid, in particular in the sub-synchronous frequency range.

Further, by such solution, the structure of the outer control of the control system can remain unchanged, and no additional controllers (e.g., PSS) are necessary in order to provide the damping of the oscillations. It is further not necessary to modify any of the reference values provided in the control system. Compared to conventional methods, which imprint an anti-oscillation signal onto these reference values, the use of plural states and the possibility to configure the control structure (or feedback structures) in the desired way provides a significantly larger degree of freedom, which results in an optimized tuning of the inner controller and a better damping of the oscillations and avoidance of SSCI. Furthermore, by making the system passive, a robust solution that counteracts grid oscillations is achieved regardless of the grid configuration. As the power system is passive at the predefined frequency range, control interactions with the grid are naturally avoided.

The outer controller may for example receive an active and/or reactive power reference, for example from a wind turbine controller or a wind farm controller. It may generate a current reference, a voltage reference, or a flux reference for the DFIG. The state may in particular be a state variable. The state may be obtained as a respective input signal. It may for example be received as an input signal from another controller or a sensor, it may be measured by a respective sensor forming part of the control system, it may be estimated based on another received or measured signal, e.g., based on one or more different states.

In an example, the state feedback controller may be configured to obtain (e.g., receive or measure) at least two states of the power system or the grid that are different from the control variable. In other example, the state feedback controller may be configured to obtain at least one, three, four, five or more states of the power system or the grid that are different from the control variable. The feedback structure of the state feedback controller may be configured to provide one or more (e.g., all) poles of a closed loop transfer function of the electrical power system at pole positions selected such that the damping is provided by the control of the rotor side converter. For example, feedback parameters of the feedback structure (in particular the parametrization for the inner controller, including for a feedback branch for the control variable) may be derived from the selected pole positions (e.g., desired or predefined pole positions) at which the electrical power system acts passively and provides the damping.

In an example, the predefined frequency range may be a frequency range below a grid frequency of the power grid (e.g., below 50 Hz or 60 Hz), and may be a frequency range comprising a sub-synchronous oscillation mode of a series capacitor compensated (SCC) power line coupled to the power system. It may for example be a frequency range between the grid frequency and 10%, 20% or even 50% below the grid frequency. It should be clear that the system may also act as a passive system outside this frequency range, i.e., the frequency range only defines the minimum range in which passivity is present. By acting as a passive system in such frequency range, the sub-synchronous oscillation modes of SCC power lines may be damped efficiently.

The predefined frequency may for example be in the range of 10% below and above a nominal grid frequency of the power grid, at least 20% below and above the nominal grid frequency, or the system may be passive over a wider range, for example at least within a range between 40 Hz and 70 Hz, or even between 20 Hz and 80 Hz. Accordingly, both sub-synchronous and super-synchronous oscillation modes of SCC power lines may be damped efficiently.

In an embodiment, the control structure of the state feedback controller may be selected such that the control of the rotor side converter causes the electrical power system to have a positive conductance (real part of admittance) at least in the predefined frequency range. Positive conductance means that the system dissipates electrical power within the predefined frequency range, thus damping the oscillations.

The control variable based on which the inner controller controls the RSC may be one of a rotor current of the rotor of the DFIG, a stator current of stator of the DFIG, a stator voltage of the stator of the DFIG, a secondary side voltage (LV side) of a transformer of the electrical power system, the secondary side of the transformer being coupled to the stator of the DFIG and the primary side of the transformer being coupled to the power grid (in particular to or via a SCC power line), a rotor flux of the rotor of the DFIG, or a stator flux of the stator of the DFIG (i.e. magnetic flux). A respective reference value may be received by the inner controller from the outer controller. It should be clear that several control variables are conceivable for controlling DFIG operation; however, rotor current or rotor flux may be used as control variables.

The electrical power system may be a three-phase system and the respective control may accordingly occur for all three phases of the electrical power system.

The at least one state of the power system or the power grid may comprise at least an external state that may be external to the inner controller or to the control system (the external state may be related to the (wind turbine) electrical power system, or to the power grid, in particular to the power line, it may for example correspond to an operating parameter of the DFIG). The at least one state may comprise an external state, an internal state that is internal to the inner controller, or both. In an embodiment, the at least one state may comprise at least one state of the electrical power system and at least one state of the power grid, in particular of a SCC line coupled to the electrical power system. In an example, two or more states of the power system, two or more states of the power grid, or a combination thereof may be provided as input to the inner controller.

In an example, the at least one state of the electrical power system or power grid may comprise at least one or a combination of a state of the DFIG, a state of a grid side filter of the power system (e.g. harmonic filter), and a state of a compensation capacitor coupled to the electrical power system (in particular a compensation capacitor of a SCC power line that may be connected in series with the power line and coupled to the power system). In an embodiment, a combination of such states may be obtained by the inner controller.

The at least one state, in particular the at least two states, may comprise at least a state corresponding to a control output of the inner controller and/or a capacitor voltage of a compensation capacitor of a series capacitor compensated power line coupled to the electrical power system.

For example, the at least one state of the electrical power system or the power grid may comprise at least a rotor current of the DFIG and/or a stator current of the DFIG, a state corresponding to the control output of the inner controller, such as a rotor voltage reference of the RSC, and a capacitor voltage of a compensation capacitor of the SCC power line coupled to the electrical power system. By receiving such state variables, the inner controller may have sufficient information and sufficient degrees of freedom available that allow an effective and efficient control of the RSC and thus of the DFIG in such a manner that passivity of the system in the predefined frequency range may be achieved. In an example, further states may be received by the inner controller, which may allow an even better tuning of the control and better damping of oscillations.

The state feedback controller may also receive one or more operating parameters that are indicative of a state of the electrical power system (i.e., these parameters may not directly be states). The one or more operating parameters may for example comprise one or a combination of stator voltage of the DFIG, a rotor speed of the rotor of the DFIG, and a grid frequency of the power grid. By providing such additional parameters that may comprise information on the states, and by considering the respective signals in a control structure of the inner controller, control of the DFIG and passivity of the power system in the desired frequency range may be further improved.

In an embodiment, the inner controller may provide, as a control variable, a rotor voltage reference to the rotor side converter. In accordance with such rotor voltage reference, semiconductor switches of the RSC may be controlled such that a respective voltage is output to the rotor of the DFIG, which results in the desired rotor currents. The control system or the RSC may for example comprise a respective pulse generator that generates pulses for controlling semiconductor switches of the RSC using pulse width modulation (PWM), so as to synthesize the required voltage signal applied to the DFIG rotor.

The control structure, and in particular the feedback structure, of the state feedback controller may be configured to provide the output of the state feedback controller as a linear combination of feedback branches associated with the states obtained by the state feedback controller. By providing the output as a linear combination, the complexity of the inner controller may be kept relatively low and non-linear variables, such as vector magnitudes, active and reactive powers and the like may be avoided. Controller setup and analysis may be thereby facilitated.

The control or feedback structure of the state feedback controller may comprise a feedback branch for each of the received states. Each feedback branch may comprise a gain element that applies a gain and/or a filter applying a transfer function to the respective state (i.e., to the respective received signal, such as a measured signal, a signal received from another controller or the like). The controller output may be then based on a linear combination of these feedback branches.

At least one of the feedback branches may for example comprise a scalar or real gain, a complex gain, a complex symmetric gain, or a symmetric or asymmetric matrix gain. In some examples, the gain or the transfer function of at least one feedback branch may be adaptive. It may for example depend on at least one of a rotor speed of the DFIG rotor or a grid frequency of the power grid. By providing such adaptive gain or transfer function, further information available may be used efficiently in the control and the control may adapt to current operating conditions. The damping of the oscillations may thus further be improved.

In some examples, the gain and/or transfer function of a feedback branch or of all feedback branches may be time invariant. Controller configuration may thereby be simplified.

The control structure may comprise feedback parameters that determine the feedback gain for the at least one state. The feedback gain may for example be provided in the respective feedback branch by one of the gain elements mentioned above or by the respective transfer function of the branch, the gain may also be set to zero for a state that does not provide useful input for the desired feedback control (there may however be at least one additional state, i.e., besides the control variable, having non-zero gain).

The feedback parameters of the state feedback controller may be selected such that poles of a closed loop transfer function modeling the electrical power system and a power line or the power grid connected thereto may be arranged at locations that result in the damping of the oscillations. For example, the feedback parameters of the control structure may be set such that the poles may be placed in the s-plane or z-plane to the left side of the imaginary axis, resulting in a system in which frequencies may be damped in the desired frequency range. Different methods are known in the art to achieve such poles placement in a system in which feedback parameters can be controlled, and they may be employed here. The closed loop transfer function for example models the DFIG and the series capacitor compensated power line. The feedback matrix of the system may be determined such that the poles of the characteristic equation of the system are positioned at the desired locations, the feedback matrix providing the feedback parameters for the state feedback controller.

In particular, the response of the electrical power system is controlled by setting the feedback parameters such that the electrical power system behaves as a passive system in the predefined frequency range.

In an example, the control structure may comprise feedback parameters that determine the feedback gain for an error signal determined based on the reference value for the control variable and the feedback value for the control variable, for example in a respective feedback branch. The feedback gain for the error signal may be determined by the (desired) pole position of the poles of the closed loop transfer function. The feedback parameters for the at least one state, in particular the at least two states, and for the error signal may accordingly be derived from a pole placement that achieves the desired damping. The feedback parameters may thus be selected such that the pole positions are arranged so as to provide the damping.

In an embodiment, the feedback parameters of the state feedback controller may be determined by employing a linear quadratic regulator (LQR). In particular when multiple additional states may be used as input for the inner controller, a linear quadratic regulator facilitates the finding of the desired feedback parameters to achieve the desired passivity of the system. The LQR algorithm in particular finds automatically the feedback parameters of the state feedback controller by minimizing cost functions, which can for example be indicative of the deviation of control parameters/variables from their desired reference values. The use of a linear quadratic regulator for deriving respective feedback parameters of a state feedback controller is commonly known and will not be explained in greater detail here.

The feedback parameters may also be determined by making use of Ackermann's formula. By employing Ackermann's formula, feedback parameters for the state feedback controller may likewise be determined in such way that the poles of the closed loop transfer function may be placed at the desired locations to achieve damping, in particular to the left of the imaginary axis in the s-plane or inside the unitary circle in the z-plane.

In an example, the feedback structure of the state feedback controller may comprise s at least a feedback branch for an error signal determined based on the reference value for the control variable (and a feedback branch for the control variable), a feedback branch comprising a complex gain for a state in form of a rotor current signal, and a feedback branch comprising a complex gain for a state in form of a stator current signal. The control structure further comprise s at least a feedback branch comprising a complex gain for a state in form of a compensation capacitor voltage (of a SCC power line), and a feedback branch comprising a complex gain for a state indicative of a rotor voltage reference for the DFIG rotor (which may correspond to the output of the inner controller). The outputs of the feedback branches may be combined linearly to provide a controller output of the inner controller, by which the operation of the RSC and thus the DFIG may be controlled. Such state feedback controller may provide sufficient degrees of freedom and may have sufficient information available to provide a fast and efficient damping of oscillations occurring on the power grid or a SCC power line, and in particular to avoid sub-synchronous control interaction, SSCI.

The state feedback controller may further comprise an integrator integrating an error signal determined based on the reference value of the control variable to generate an internal state. It may further comprise a feedback branch that comprises the respective integrator, and that may further comprise a respective gain element or filter. Accordingly, with respect to the control variable, the inner controller may make use of proportional (P) and integral (I) feedback branches and may thus comprise aspects of PI control.

As the control structure and in particular the feedback parameters of the inner controller may be obtained analytically or via LQR, obtaining an optimal controller configuration for the prevailing circumstances may be facilitated and it may further be facilitated to evaluate the short-circuit ratio range and compensation factor (CF) at which the control works as desired. At the same time, the linearity can be maintained.

It should be clear that the number and types of states used and the configuration of the control structure, in particular the gains or transfer functions used in the feedback branches depend on the availability of states in the respective power system, the particular configuration of the wind turbine and the environment in which the wind turbine operates. They can thus not be determined in advance, but are determined for the respective application and situation by using the above indicated controller design methods.

According to an example, a wind turbine is provided. The wind turbine may comprise a respective control system and power system is provided according to any of the disclosed examples.

According to another aspect of embodiments of the present invention, a method of controlling the operation of a doubly-fed induction generator of a (wind turbine) electrical power system is provided. The method comprises the generating of a reference value for a control variable in accordance with which the operation of the DFIG is to be controlled by the outer controller, the receiving of the reference value for the control variable from the outer controller by an inner controller which implements an inner control loop, and the providing of feedback control of the rotor side converter by the inner controller so as to operate the DFIG at the reference value. The inner controller is a state feedback controller. The method further comprises receiving, by the state feedback controller, at least one state of the power system that is different from the control variable and controlling, by the state feedback controller, the rotor side converter based on the received reference value for the control variable, a feedback value for the control variable and the at least one state. The control structure of the state feedback controller is selected such that the control of the rotor side converter causes the electrical power system to act as a passive system at least in a predefined frequency range to thereby provide damping of oscillations in the frequency range. By such method, advantages similar to the ones outlined further above may be achieved.

The method may comprise any method steps described above and further below with respect to the control system, the electrical power system or components thereof. In particular, the method may be performed by the control system having any of the configurations described herein.

According to a further aspect of embodiments of the present invention, a computer program product, comprising a computer readable hardware storage device having computer readable program code stored therein, said program code executable by a processor of a computer system to implement a method for controlling the operation of a doubly-fed induction generator is provided. The computer program comprises control instructions which, when executed by a processing unit of a control system that controls the operation of the doubly-fed induction generator, causes the processing unit to perform any of the methods described herein. The computer program may be implemented on a volatile and/or non-volatile data carrier or storage medium, and the data carrier or storage medium may store the respective control instructions.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 12 is a flow diagram illustrating a method according to an example of embodiments of the invention.

DETAILED DESCRIPTION

Figure 1:
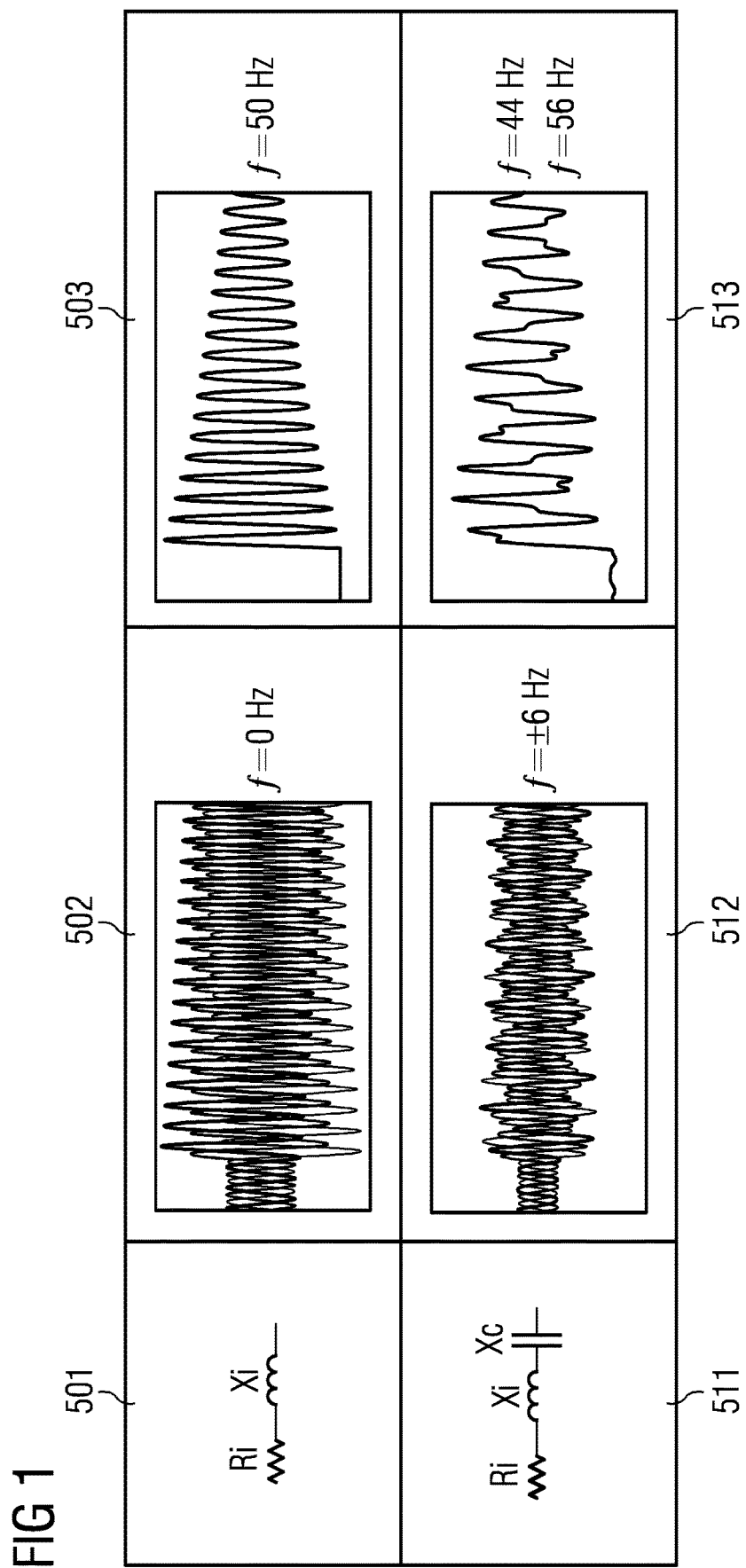
FIG. 1 is a schematic diagram illustrating the occurrence of oscillations in a power line and in a SCC power line upon a voltage transient, both for the current waveform and the power waveform.

In the following, embodiments and/or examples of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Figure 7:
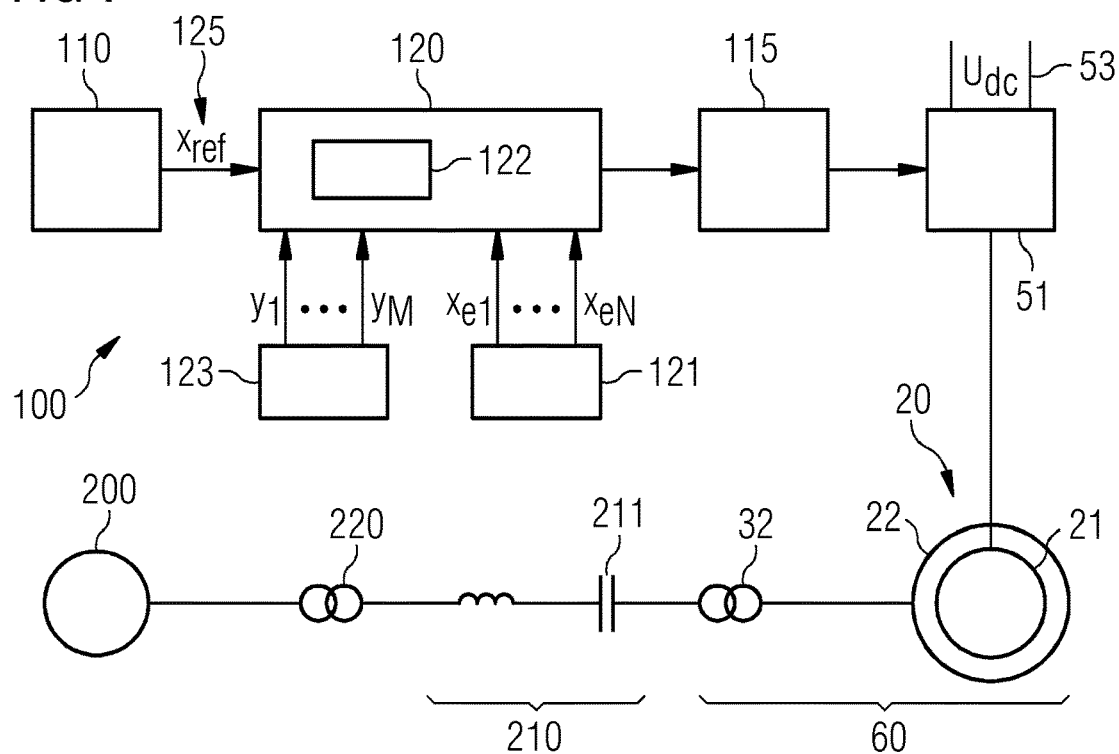
FIG. 7 is a schematic drawing showing a control system for a DFIG according to an example of embodiments of the invention.

FIG. 7 schematically illustrates a control system 100 that may control the operation of the DFIG 20 of the wind turbine electrical power system 60. The electrical power system 60 may be configured as described with respect to FIG. 2 and may in particular comprise the DFIG 20 and the converter 50. It may further comprise the wind turbine transformer 32, and the harmonic filter 31 (see FIG. 2) may optionally be provided. The SCC power line 210 may for example form part of a wind farm power grid connecting the wind turbine to a substation, and the transformer 220 may be a substation transformer. The SCC power line 210 may also be a power line of the power grid 200, e.g., of a utility grid, an island grid or the like. The explanations provided with respect to FIG. 2 and FIG. 5 apply correspondingly to the system of FIG. 7 with the differences described herein below.

The control system may comprise the outer controller 110, which may receive an operating set point for the DFIG 20, for example an active power and/or reactive power reference. As in conventional systems, the outer controller 110 may generate a reference value $x_{ref}$ 125 for a control variable and may provide the reference value to the inner controller 120 which may also be comprised in control system 100. The control variable by which the operation of DFIG 20 is controlled can be implemented in different ways. Inner controller 120 may regulate the rotor current $i_r$ of rotor 21 and may accordingly receive a rotor current reference. It may regulate a stator current and may accordingly receive a stator current reference. It may regulate stator voltage, or the voltage on the low voltage (LV) side of the transformer 32, i.e., on the secondary side. It may accordingly receive a stator voltage reference or a transformer LV-side voltage reference. It is also conceivable that the controller may regulate the rotor flux or the stator flux. It may accordingly receive a rotor flux reference or a stator flux reference. Which control variable is employed in the control of DFIG 21 and accordingly, which kind of reference 125 the inner controller 120 receives from outer controller 110 is a question of the particular implementation and may be chosen in accordance with the application and circumstances.

The inner controller 120 may provide closed loop control based on the received reference value for the control variable 125, i.e., it may control the DFIG 20 via the RSC 51 such that the control variable tracks the reference value. To effect the control, the inner controller 120 may provide for example a voltage output, which may configure the rotor side converter modulating voltage, to the PWM generator 115 that may perform a respective pulse width modulation. Semiconductor switches of RSC 51 may be switched in accordance with the modulation signal to generate the voltage that may result in the respective value of the control variable, for example the respective rotor current of DFIG 20. Respective control methods are known in the art and may be employed with embodiments of the invention.

Figure 5:
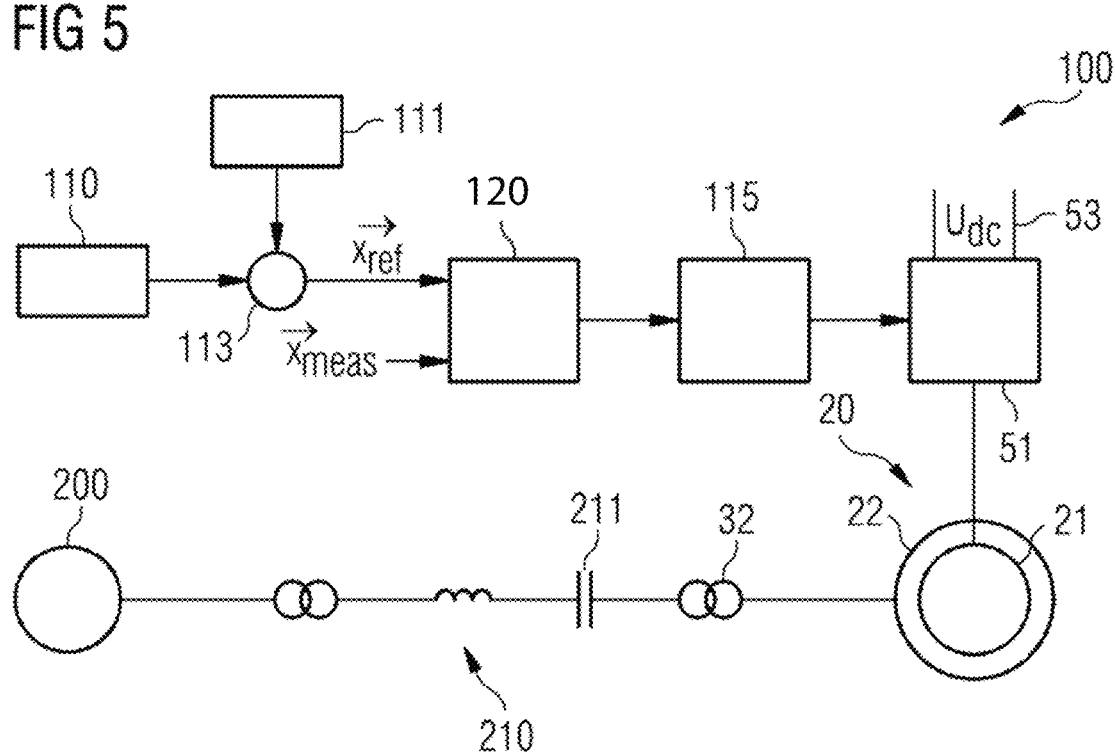
FIG. 5 is a schematic drawing showing a control system for a DFIG that comprise s a power system stabilizer (PSS) according to the conventional art.
Figure 6:
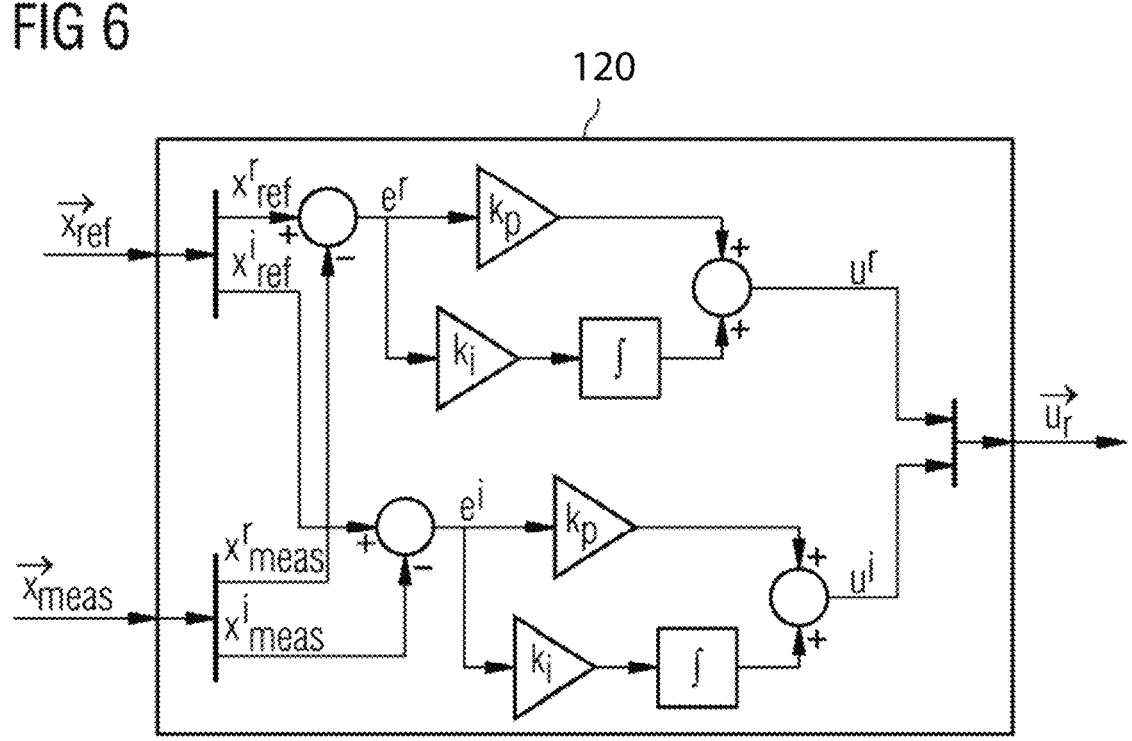
FIG. 6 is a schematic drawing showing the configuration of a conventional converter controller.

In conventional solutions, the inner controller 120 is implemented as a simple PI controller, as illustrated in FIGS. 5 and 6. In contrast, the inner controller 120 according to an example may be implemented as a state feedback controller. As such, the inner controller 120 may be configured to obtain external states $x_{ei}$ 121 (states $x_{e1}$ to $x_{eN}$, N being the number of external states). These external states may comprise but are not limited to rotor current of rotor 21, stator current of stator 22, rotor flux, stator flux, generator magnetizing current, generator short-circuit current, grid side filter 31 inductor current, a capacitor voltage of a compensation capacitor 211, a combination of such states or the like. The external states 121 may comprise a feedback value for the control variable 125 and may comprise at least one additional external state. Accordingly, the degrees of freedom available for providing feedback control may be increased so that the response of the inner controller 120 can be tuned. This allows the inner controller 120 to be configured in such way that it may cause the power system 60 to act as a passive system in the frequency range of the oscillations occurring in SCC power lines. Furthermore, the inner controller 120 may be configured to receive other signals $y_1$ to $y_M$, in particular additional operating parameters 123, that are not directly a state but that may comprise information associated with states. Examples of such additional parameters $y_i$ comprise stator voltage, rotor speed of rotor 21, grid frequency and the like. These allow a further tuning of the inner controller 120 to achieve a passivity of the system over a wide range of frequencies. The inner controller 120 may furthermore generate internal states 122 designated as $x_{int1}$ to $x_{intN}$, which may likewise be used in the feedback loop and thus in the generation of the controller output. Examples may be an integrator that may integrate an error signal so that the reference value 125 can be tracked efficiently.

The respective variable (e.g., $x_{ref}$, $x_{ei}$, $x_{inti}$, $y_i$) may be a multidimensional vector or a scalar. It should further be clear that the control may occur for all three phases of the three-phase power system.

By providing the inner controller 120 with as many states of the system as possible, which may comprise one or more states of the power system 60 but may also comprise one or more states of the power grid, e.g., of the connected compensated power line 210, the number of degrees of freedom may be increased and an optimized controller design may be achieved. In some implementations, a predefined number of external states 121 may be provided to the inner controller 120. In other implementations, all available states of the system may be provided to inner controller 120, and the controller 120 may implement a full state feedback controller (FSFB). By "all states" it is meant all the states required to uniquely describe a particular state of the electrical system, comprising in particular the electrical power system 60 and the power line 210.

The inner controller 120 may obtain external states 121 by receiving respective measurement signals from sensors, for example sensors measuring rotor/stator current or the like. Such sensors may form part of the control system 100. Further, the states may be received as respective signals from other components of the wind turbine or the power system 60, for example from converter 50, from a wind turbine controller or the like. The wind turbine controller may for example perform a measurement of the voltage on the LV side of transformer 32 and may provide the respective measurement signal as a state to the inner controller 120. Some states may be estimated, for example based on measurements of other operating parameters. Obtaining the external states may thus occur by measuring, observing, receiving, estimating or calculating. In an embodiment, at least one or more states may be directly observed by inner controller 120, for example the rotor current.

Figure 8:
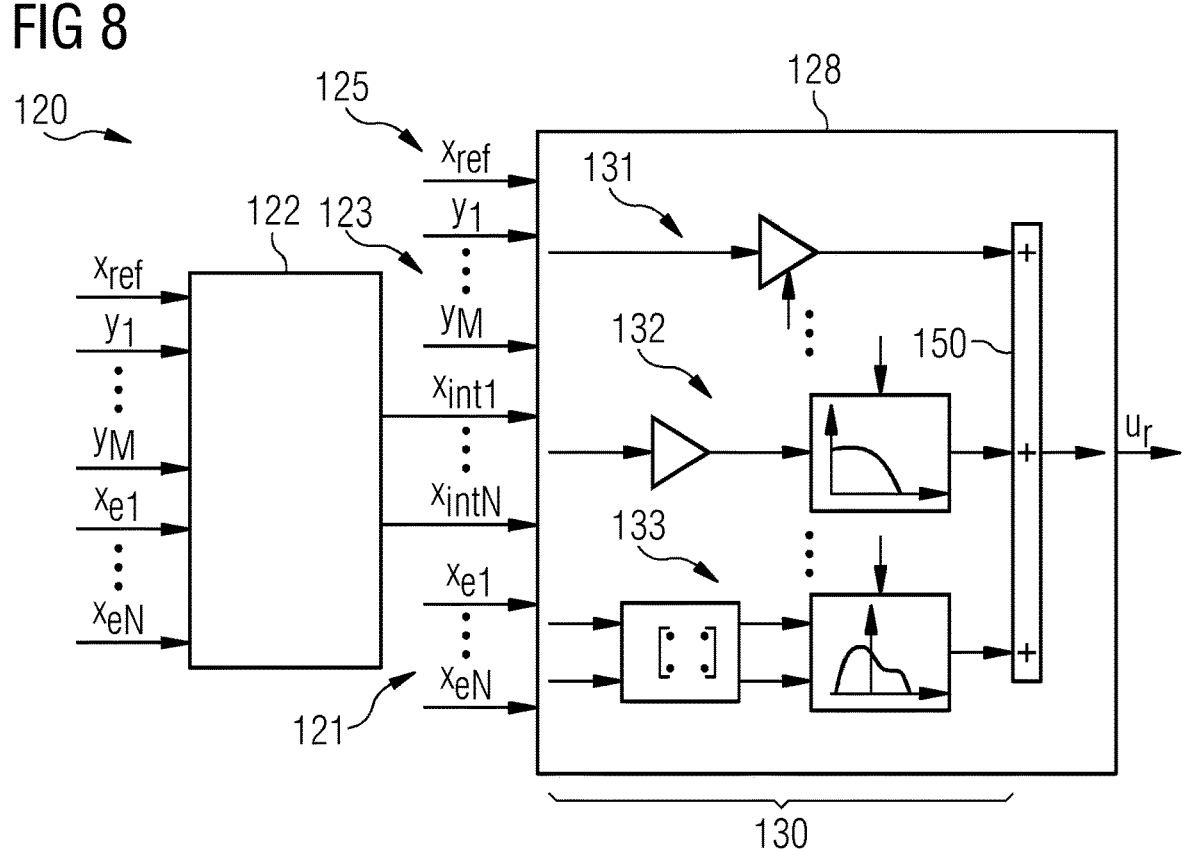
FIG. 8 is a schematic drawing showing the configuration of an inner controller according to an example of embodiments of the invention.

The internal control structure or feedback structure 128 of the inner controller 120 is schematically illustrated in FIG. 8. FIG. 8 illustrates the internal states 122 that may be determined on the basis of the received reference value 125, the external states 121 and the additional operating parameters 123. Internal states may for example be generated by integration, derivation, other types of calculations, and the like. The additional operating parameters may likewise be obtained through observation, measurement, reception from a different controller and the like.

The control structure 128 may comprise a number of feedback branches 130 the output of which may be linearly combined at 150. In particular, the outputs of all the feedback branches may be added to obtain the resulting output of the inner controller 120. Each feedback branch may comprise one or a combination of a scalar or real gain, a complex (symmetric) gain, or a symmetric or asymmetric matrix gain, or predefined transfer functions (i.e., the respective state may be filtered in accordance with a predefined transfer function). Some of the elements employed in the feedback branches may be adaptive, for example as a function of one or a combination of the received inputs. This is exemplarily indicated by vertical arrows in the branches 130 in FIG. 8.

Feedback branch 131 may for example comprise an adaptive real or complex gain. Feedback branch 132 may comprise a fixed real gain and an adaptive transfer function. Feedback branch 133 may operate on two inputs of the controller and may implement a matrix gain and an adaptive transfer function. As an example, a gain or a transfer function may be adaptive as a function of rotor speed of rotor 21 or of a grid frequency of power grid 200. In other examples, the control structure 128 may only comprise gains (scalar, complex or matrix) and no transfer functions. In even further examples, the gains and/or transfer functions may be time invariant and may not be adaptive.

It should further be clear that one or more of the feedback branches may also receive as an input one of the internal states $x_{inti}$ 122 (i=1 . . . N), as shown in FIG. 8. The internal states may be created by using external states 121, measurements of other operating parameters 123 and references (e.g., 125) as a source. The internal state generation 122 may comprise an integrator and/or resonator to track the received reference at the working frequency, for example at 50 Hz or 60 Hz.

In the example of FIG. 8, the output of the inner controller 120 may be the rotor modulating voltage $u_r$, which may be applied to the rotor 21 by the PWM generator 115 and the rotor side converter 51.

It should be clear that the inner controller 120 may operate in any desired reference frame, for example it may operate in a synchronous (dq) reference frame, a stationary ($\alpha\beta$) reference frame or any other desired reference frame.

For configuring the inner controller 120 for use in a particular operating environment, i.e., with a particular wind turbine, the available external states 121 and the available additional operating parameters 123 may be determined and the control structure 128 may be set up with a respective number of feedback branches 130. It should be clear that not all available external states and additional operating parameters need to be used, but a selection may be made, for example with respect to their sensitivity to system oscillations. In an example, a real or complex gain may be applied in each feedback branch to the respective input. The feedback parameters of such control structure, for example the real or complex gains of the respective gain elements of the different feedback branches, may then be determined. The feedback parameters may be generally tuned such that the electric power system 60 may act as a passive system in the desired frequency range, in particular at the frequencies at which the sub-synchronous oscillation modes of the SCC power line occur, and thus, at the frequencies of the SSCI. This may be the frequency range below the synchronous frequency (i.e., the grid frequency), e.g., 50 Hz or 60 Hz. This may be achieved by looking at the closed loop transfer function of the overall system. The characteristic function of the system may generally have poles which may be in the s-plane or z-plane on the right side of the imaginary axis and thus result in undamped oscillations. The coefficients of the feedback matrix and thus the respective feedback parameters of the control structure 128 may then be selected such that the poles of the system are moved into the plane to the left of the imaginary axis, and thus have a negative real part, resulting in the damping of oscillations. Respective pole placement techniques are commonly known and may be employed with any of the disclosed examples. For a time, invariant implementation of the control system, Ackermann's formula may for example be used to solve the resulting pole positioning problem.

In an embodiment, the feedback parameters of the inner controller 120 may be determined by using a linear quadratic regulator. Such linear quadratic regulator may for example be implemented by using cost functions for deviations of measurements from desired values, the overall cost function being defined as a sum of these deviations. The algorithm may then find the controller settings that minimize the cost function. Consequently, the set of feedback parameters for the inner controller 120 may be obtained. How to apply a linear quadratic regulator to obtaining a controller configuration is generally known and will therefore not be explained in greater detail herein.

The grid (comprising transformer and lines), the generator and the (voltage source) converter 50, comprising RSC 51 and GSC 52, may generally constitute a complete electrical system, wherein the only active parts may be the RSC and the GSC, which may be governed by the respective (multi-loop) controllers. By focusing on the control by the RSC, the system may be modeled easily using a respective closed loop transfer function. A respective implementation of the inner controller 120 may be particularly advantageous since the influence of the RSC inner controller 120 on the passivity of the system in the sub-synchronous frequency range is higher than for any other element of the system. Accordingly, by a respective inner controller configuration, passivity of the system in the sub-synchronous frequency range may be achieved and sub-synchronous control interactions, SSCI, are naturally damped. System stability can thereby be guaranteed.

Figure 9:
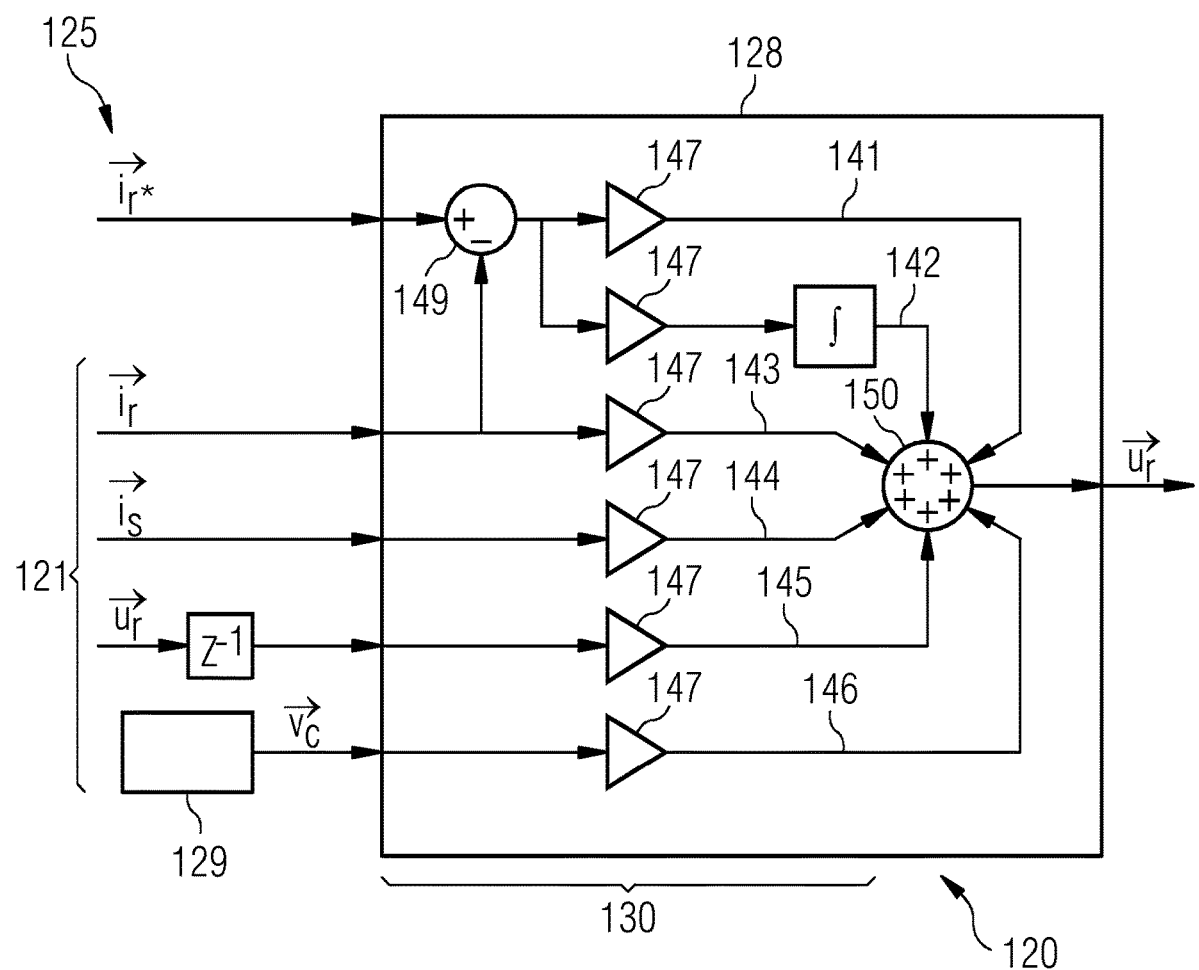
FIG. 9 is a schematic drawing showing the configuration of a particular implementation of an inner controller according to an example of embodiments of the invention.

FIG. 9 illustrates a particular implementation of the inner controller 120 with a control structure 128 that makes use of external states 121, reference value 125, and internal states that may be determined internally in the inner controller 120. Controller 120 may receive the reference value 125 in form of the rotor current $i_r^*$. It may further receive as external states the rotor current $i_r$, the stator current is, the rotor voltage $u_r$, and the estimated capacitor voltage $v_C$, which may be determined by a capacitor voltage estimator 129, that may be internal or external to the inner controller 120. The capacitor voltage estimator 129 may for example estimate the capacitor voltage on the basis of a stator current, a grid current and a converter current in the grid side converter 52.

The feedback branches 130 may comprise the feedback branches 141 to 146 the output of which may be linearly combined at the linear combiner 150. In the example of FIG. 9, each feedback branch may comprise a complex gain element 147, although it should be clear that each element 147 may apply a different complex gain in each feedback branch. At the summation node 149, the feedback value $i_r$ of the control variable may be subtracted from the reference value $i_r^*$ of the control variable, resulting in an error signal. This error signal may be processed in a first feedback branch 141. Furthermore, in a second feedback branch 142, the complex gain 147 may be applied to the error signal and the error signal may be integrated. The feedback branch 142 may thus relate to an internal state of controller 120 that may be created internally. Feedback branches 143 and 144 may apply a complex gain 147 to the rotor current and the stator current, respectively. Feedback branch 145 may apply a complex gain to the rotor modulating voltage $u_r$, and feedback branch 146 may apply a complex gain to the compensation capacitor voltage $v_C$.

As outlined above, the gain of each of the gain elements 147 may be freely set and these gains may be the feedback parameters that may be determined such that the system is passive in the desired sub-synchronous frequency range to provide damping of oscillations. Accordingly, using one of the pole placement methods described above or using the linear quadratic regulator, the gains of these gain elements may be determined in such a way that the poles of the characteristic function of the system are located to the left side of the imaginary axis thus resulting in a passive system providing damping. The gains for the gain elements 147 determined in this way may be then configured in the control structure 128, upon which the controller 120 may be put into operation.

The example corresponds to a complex PI control of the rotor current and the employment of the different states comprising rotor current, stator current, voltage of the compensation capacitor and the rotor voltage reference as complementary states. The described feedback parameter tuning may assure the passivity of the system in the sub-synchronous region. Further, to refine operation of the controller and to further increase the degrees of freedom for controller tuning, additional states or additional external operating parameters 123 may be employed in controller 120.

Figure 10:
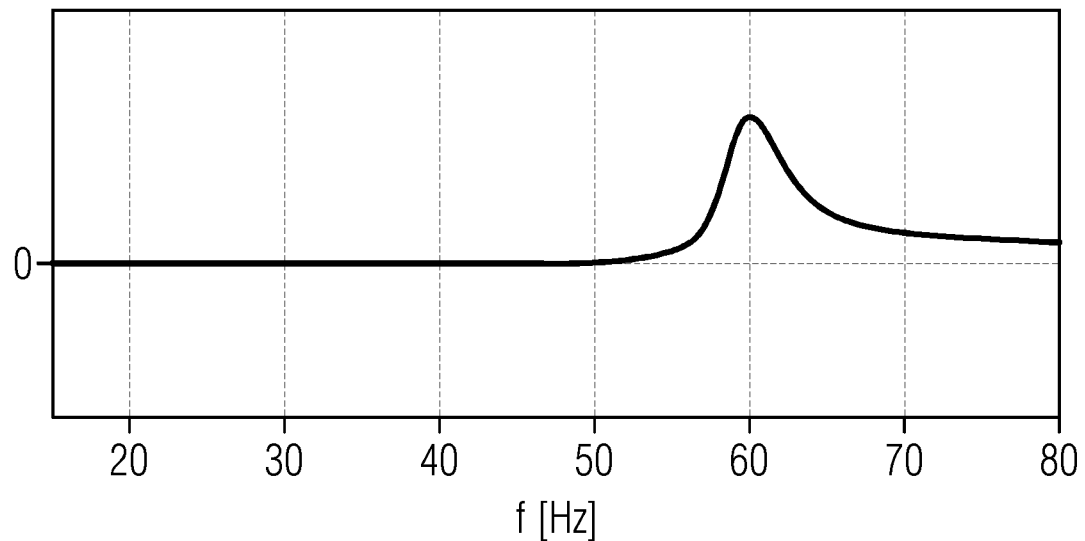
FIG. 10 is a schematic diagram showing the conductance of a wind turbine electrical power system at different frequencies when operated by a control system according to an example of embodiments of the invention.

FIG. 10 illustrates an example of the closed loop conductance of the wind turbine electrical power system in arbitrary units as a function of frequency. It can be seen that by the respective inner controller 120, the conductance is positive over the relevant frequency range, in particular in the range below the grid frequency of 60 Hz. The conductance was obtained analytically using an inner controller 120 having a configuration corresponding to the one described above. The system may thus be naturally damped and accordingly may provide damping upon the occurrence of oscillations on a SCC power line. It is in particular not necessary to generate any anti-oscillation signals using a power system stabilizer, as in the conventional art solutions.

Figure 4:
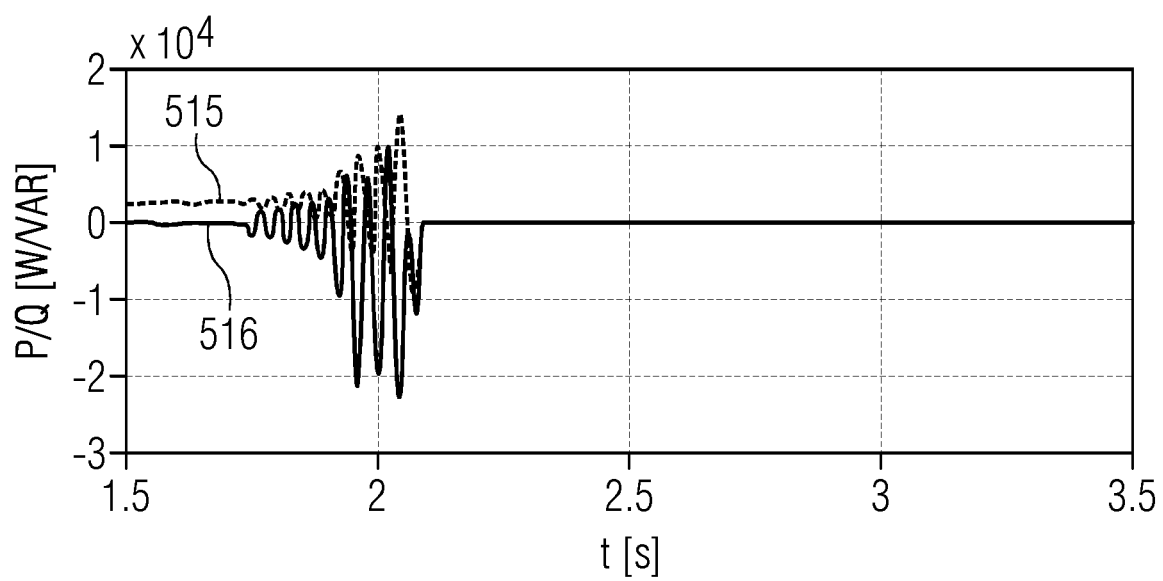
FIG. 4 is a schematic diagram illustrating active and reactive power when a conventional wind turbine electrical power system is coupled to a SCC power line.
Figure 11:
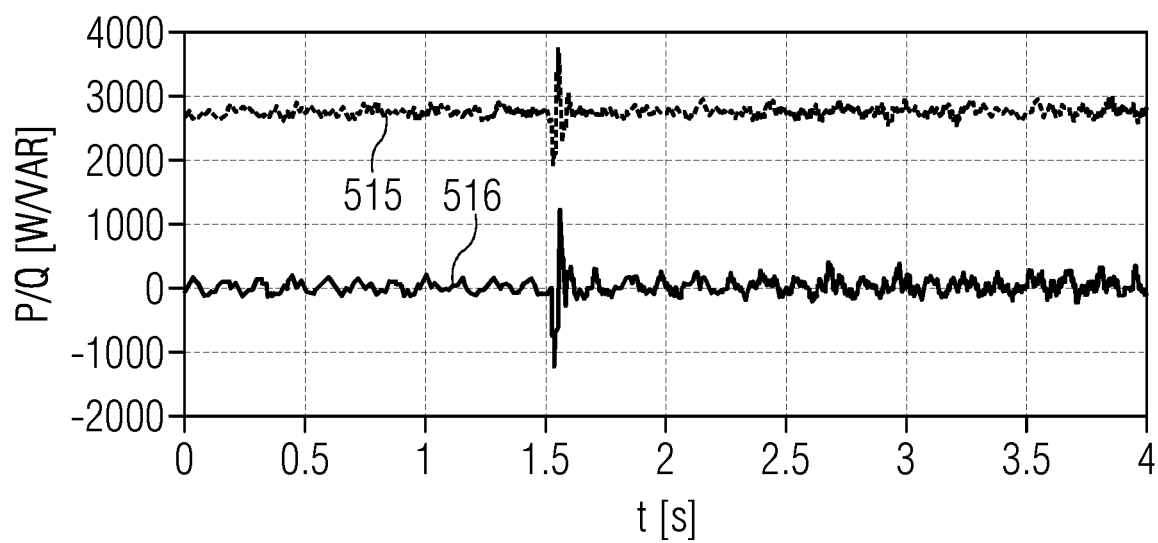
FIG. 11 is a schematic diagram illustrating active and reactive power when a wind turbine electrical power system is coupled to a SCC power line and operated by a control system according to an example of embodiments of the invention.

FIG. 11 illustrates the experimental validation of the respective controller implementation on a DFIG small scale test bench with a power rating of 11 KW. The inner controller was configured in accordance with the previous examples, and the effect of the SCC power line was emulated by a cabinet with capacitors and inductors as described with respect to FIG. 4. Curve 516 shows the reactive power while curve 515 illustrates the active power. At about 1.5 seconds, the SCC power line becomes predominant, and it can be seen that the power system efficiently damps and avoids sub-synchronous interactions. In particular, the oscillations caused by the compensated power line are damped so that the system can stay connected to the power grid and can continue to supply active and reactive power. This is accordingly a significant advantage over conventional systems.

FIG. 12 shows a flow diagram of a method in accordance with an example of embodiments of the invention. In step 301, an operating setpoint for the DFIG may be received at the outer controller 110, for example an active/reactive power reference. Alternatively, the outer control may also regulate voltage or DC link voltage. In step 302, the outer controller may generate a reference value for the control variable for the DFIG, for example the rotor current reference $i_r^*$. The reference value for the control variable may be received in step 303 at the inner controller 120. The inner controller 120 may further receive in step 304 a feedback value ($i_r$) for the control variable and receives one or more further states, e.g., is, $u_r$, $v_C$ and the like. Using state feedback control and respective feedback parameters, such as gains, the inner controller may generate in step 305 a control output from the received feedback value and states. It may for example generate the rotor-modulating voltage as an output. In step 306, the rotor side converter may be controlled based on the control output of the inner controller 120, thereby controlling the operation of the DFIG 20. As indicated above, the rotor-modulating voltage $u_r$ may be provided to the PWM generator 115, which may create a respective pulse width modulation signal supplied to the semiconductor switches of RSC 51, which in turn may apply the respective rotor voltage to the rotor 21 so that respective rotor currents may be obtained in the rotor 21.

Generation of the control output in step 305 may occur by the inner controller 120 having any of the configurations described herein, and in particular may occur such that the overall system is a passive system in the desired frequency range, in particular at the sub-synchronous frequencies. The method may be performed by any of the control systems described herein.

Figure 2:
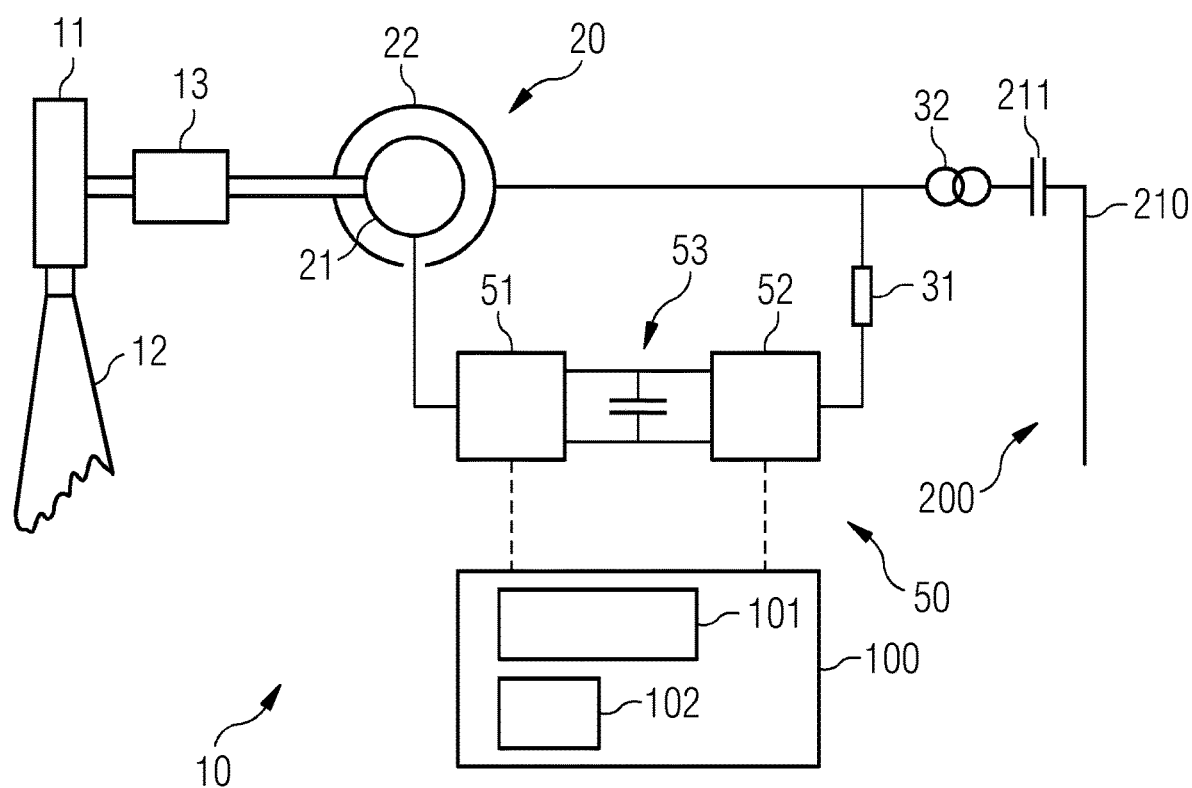
FIG. 2 is a schematic drawing showing a wind turbine comprising an electrical power system and a control system.
Figure 3:
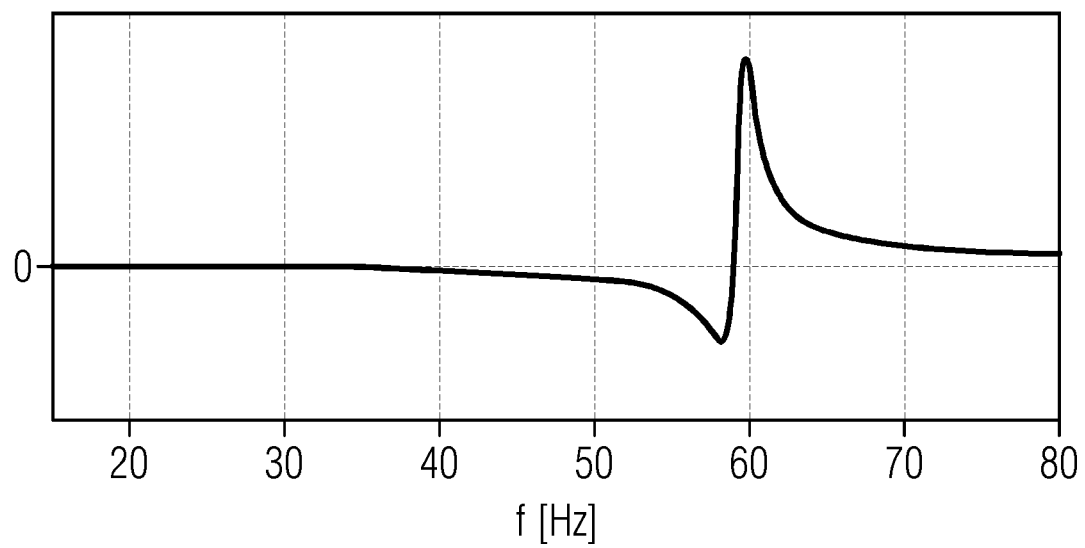
FIG. 3 is a schematic diagram showing the conductance of a conventional wind turbine electrical power system at different frequencies.

As illustrated in FIG. 2, the control system 100 may comprise a processing unit 101 and a memory 102. The inner controller 120 and/or the outer controller 110 in any of the configurations described herein may be implemented by a respective processor and memory and may in particular be implemented by control instructions that may be stored in the memory 102 and that may be executed by the processing unit 101. Processing unit 101 may comprise a micro-processor, a digital signal processor, an ASIC, or a combination thereof. Memory 102 may comprise volatile and non-volatile memory, in particular RAM, ROM, Flash-Memory, a hard-disc drive and the like. Control system 100 may furthermore comprise respective input and output interfaces by which the states and other operating parameters may be obtained, for example interfaces towards sensors and communication interfaces towards other controllers or power system components. It may further comprise a control output for providing a control signal to RSC 51. Control system 100 may comprise respective connections and buses, A/D and D/A converters and the like. It may further comprise a user interface by which the user or operator can configure the control system 100.

By the examples described herein, an inner controller controlling the RSC may be provided, the inner controller implementing a state feedback controller and thus providing a solution that is well suited for three-phase power converters and that may avoid the need to use a conventional PSS. The control structures may allow the use of multiple states and measurements and may further implement a variety of feedback structures, such as scalar gains, matrix gains, transfer functions and the like. Consequently, the available degrees of freedom may be increased significantly, resulting in an optimized tuning of the controller. This is significantly different from conventional PSS-based solutions in which the main control loop operates the conventional way. The solution may implement a linear combination of the feedback paths, so that non-linear variables, such as vector magnitudes, active and reactive powers and the like may be avoided. This may facilitate controller design and analysis. The passivity based design may furthermore provide a robust solution independent on the grid configuration. Once the system is passive for the desired frequency range, control interactions with the grid may unlikely to occur. The controller configuration may be obtained analytically, which may be a further advantage, as it is easier to obtain an optimal configuration for the prevailing circumstances. Furthermore, it may be relatively simple to evaluate the range of short-circuit ratio and compensation factor (CF) within which the solution may provide the desired results while maintaining the linear range. There may be accordingly significant advantages over conventional control systems.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control system for controlling the operation of a doubly fed induction generator, DFIG, of an electrical power system, wherein the electrical power system is configured to provide electrical power to a power grid and comprises a rotor side converter coupled to a rotor of the DFIG to control operation of the DFIG, the control system being coupled to the rotor side converter to control the rotor side converter, wherein the control system comprises:
an outer controller that is configured to generate a reference value for a control variable in accordance with which the operation of the DFIG is to be controlled,
an inner controller that is configured to provide an inner control loop and to receive from the outer controller the reference value for the control variable, wherein the inner controller is configured to provide feedback control of the rotor side converter so as to operate the DFIG at the reference value,
wherein the inner controller is a state feedback controller that is configured to obtain at least two states of the power system or the grid that are different from the control variable,
wherein the state feedback controller is configured to control the rotor side converter based on the received reference value for the control variable, a feedback value for the control variable and the at least two states, wherein a control structure of the state feedback controller is configured to provide one or more poles of a closed loop transfer function of the electrical power system at pole positions selected such that the control of the rotor side converter causes the electrical power system to act as a passive system at least in a predefined frequency range to thereby provide damping of oscillations in the frequency range, and
wherein the control structure comprises feedback parameters that determine the feedback gain for an error signal determined based on the reference value for the control variable and the feedback value for the control variable, the feedback gain for the error signal being determined by the pole positions of the one or more poles of the closed loop transfer function.

2. The control system according to claim 1, wherein the frequency range is a frequency range below a grid frequency of the power grid, is a frequency range comprising a sub-synchronous oscillation mode of a series capacitor compensated power line coupled to the power system, or is a frequency range between the grid frequency and 10% below the grid frequency.

3. The control system according to claim 1, wherein the control structure of the state feedback controller is selected such that the control of the rotor side converter causes the electrical power system to have a positive conductance at least in the predefined frequency range.

4. The control system according to claim 1, wherein the control variable is one of a rotor current of the rotor of the DFIG, a stator current of a stator of the DFIG, a stator voltage of the stator of the DFIG, a secondary side voltage of a transformer of the electrical power system, the secondary side of the transformer being coupled to the stator of the DFIG and the primary side of the transformer being coupled to the power grid, a rotor flux of the rotor of the DFIG, or a stator flux of the stator of the DFIG.

5. The control system according to claim 1, wherein the at least two states of the electrical power system or the power grid comprise at least one or a combination of a state of the DFIG, a state of a grid side filter of the power system, or a state of a compensation capacitor coupled to the electrical power system.

6. The control system according to claim 1, wherein the at least two states of the electrical power system or the power grid comprise at least a rotor current of the DFIG and/or a stator current of the DFIG, and a state corresponding to a control output of the inner controller, and further comprise a capacitor voltage of a compensation capacitor of a series capacitor compensated power line coupled to the electrical power system.

7. The control system according to claim 1, wherein the state feedback controller is further configured to receive one or more operating parameters that are indicative of a state of the electrical power system, the one or more operating parameters comprising one or a combination of a stator voltage of the DFIG, a rotor speed of the rotor of the DFIG, and a grid frequency of the power grid.

8. The control system according to claim 1, wherein the control structure of the state feedback controller is configured to provide the output of the state feedback controller as a linear combination of feedback branches associated with the states obtained by the state feedback controller.

9. The control system according to claim 1, wherein the control structure of the state feedback controller comprises a feedback branch for each of the received states, the feedback branch comprising a gain element applying a gain and/or a filter applying a transfer function to the respective state.

10. The control system according to claim 1, wherein the control structure comprises feedback parameters that determine the feedback gain for the at least one state.

11. The control system according to claim 10, wherein the closed loop transfer function models the electrical power system and a power line or the power grid connected to the power system, wherein the feedback parameters of the state feedback controller are selected such that the one or more poles of the closed loop transfer function are arranged at locations that result in the damping of the oscillations.

12. The control system according to claim 10, wherein the feedback parameters are determined by employing a linear quadratic regulator, LQR, or by making use of Ackermann's formula.

13. The control system according to claim 1, wherein the control structure of the state feedback controller comprises at least a feedback branch for an error signal determined based on the reference value for the control variable, a feedback branch comprising a complex gain for a state in form of a rotor current signal, and a feedback branch comprising a complex gain for a state in form of a stator current signal, wherein the outputs of the feedback branches are combined linearly to provide a controller output of the inner controller, the controller output controlling the operation of the rotor side converter.

14. A method of controlling the operation of a doubly fed induction generator, DFIG, of an electrical power system, wherein the electrical power system is configured to provide electrical power to a power grid and comprises a rotor side converter coupled to a rotor of the DFIG to control operation of the DFIG, the control method controlling the rotor side converter, wherein the method comprises:
  generating, by an outer controller, a reference value for a control variable in accordance with which the operation of the DFIG is to be controlled;
  receiving, by an inner controller implementing an inner control loop, the reference value for the control variable from the outer controller; and
  providing, by the inner controller, feedback control of the rotor side converter such that the DFIG operates in accordance with the reference value,
  wherein the inner controller is a state feedback controller and the method further comprises:
  receiving, by the state feedback controller, at least two states of the power system or of the power grid that are different from the control variable,
  controlling, by the state feedback controller, the rotor side converter based on the received reference value for the control variable, a feedback value for the control variable and the at least two states, wherein a control structure of the state feedback controller is configured to provide one or more poles of a closed loop transfer function of the electrical power system at pole positions selected such that the control of the rotor side converter causes the electrical power system to act as a passive system at least in a predefined frequency range to thereby provide damping of oscillations in the frequency range,
  wherein the control structure comprises feedback parameters that determine the feedback gain for an error signal determined based on the reference value for the control variable and the feedback value for the control variable, the feedback gain for the error signal being determined by the pole positions of the one or more poles of the closed loop transfer function.

15. A computer program product, comprising a computer readable hardware storage device having computer readable program code stored therein, said program code executable by a processor of a computer system to perform the method of claim 14.

16. A control system for controlling the operation of a doubly fed induction generator, DFIG, of an electrical power system, wherein the electrical power system is configured to provide electrical power to a power grid and comprises a rotor side converter coupled to a rotor of the DFIG to control operation of the DFIG, the control system being coupled to the rotor side converter to control the rotor side converter, wherein the control system comprises:
  an outer controller that is configured to generate a reference value for a control variable in accordance with which the operation of the DFIG is to be controlled,
  an inner controller that is configured to provide an inner control loop and to receive from the outer controller the reference value for the control variable, wherein the inner controller is configured to provide feedback control of the rotor side converter so as to operate the DFIG at the reference value,
  wherein the inner controller is a state feedback controller that is configured to obtain at least two states of the power system or the grid that are different from the control variable,
  wherein the state feedback controller is configured to control the rotor side converter based on the received reference value for the control variable, a feedback value for the control variable and the at least two states, wherein a control structure of the state feedback controller is configured to provide one or more poles of a closed loop transfer function of the electrical power system at pole positions selected such that the control of the rotor side converter causes the electrical power system to act as a passive system at least in a predefined frequency range to thereby provide damping of oscillations in the frequency range, wherein the control structure of the state feedback controller comprises at least a feedback branch for an error signal determined based on the reference value for the control variable, a feedback branch comprising a complex gain for a state in form of a rotor current signal, and a feedback branch comprising a complex gain for a state in form of a stator current signal, wherein the outputs of the feedback branches are combined linearly to provide a controller output of the inner controller, the controller output controlling the operation of the rotor side converter.

17. The control system according to claim 16, wherein the control structure of the state feedback controller comprises a feedback branch for an error signal determined based on the reference value for the control variable, a feedback branch comprising a complex gain for a state in form of a rotor current signal, and a feedback branch comprising a complex gain for a state in form of a stator current signal, wherein the outputs of the feedback branches are combined to provide a controller output of the inner controller, the controller output controlling the operation of the rotor side converter.

* * * * *